UNITED STATES PATENT OFFICE.

LEONHARD LEDERER, OF SULZBACH, GERMANY.

FILAMENTS AND OTHER PRODUCTS OBTAINED FROM CELLULOSE COMPOUNDS.

1,028,748. Specification of Letters Patent. Patented June 4, 1912.

No Drawing. Application filed September 6, 1906. Serial No. 333,467.

*To all whom it may concern:*

Be it known that I, LEONHARD LEDERER, manufacturing chemist, a subject of the German Emperor, residing at Sulzbach, Germany, have invented certain new and useful Improvements Relating to Filaments and other Products Obtained from Cellulose Compounds, of which the following is a specification.

The materials hitherto employed for the manufacture of artificial silk chiefly consist of cellulose in solution or solutions of nitrocellulose or of acetyl-cellulose.

I have found, that the compound cellulose esters, obtainable, for instance, by the action of acid anhydrids or of acid chlorids on nitrated cellulose, yield a very useful material for the manufacture of artificial silk. Acetyl-nitro-cellulose, for instance, may be obtained by the interaction of 1 part of nitro-cotton with 4 parts of glacial acetic acid containing 0.5 per cent. of sulfuric acid and 2 parts of acetic anhydrid at a temperature below 30° C. and by subsequently separating out the acetyl compound by means of water or other suitable means. These compound cellulose esters burn off much more quietly, than the raw material and may consequently be worked up without danger. By treatment with suitable chemicals they may be completely or partly deprived of the nitro groups, and the other acid residues may also be split off. Owing to these properties a great variety of artificial silks may be produced. For the manufacture of the same I commence in the known manner by causing solutions of the compound cellulose esters to pass through fine orifices into suitably heated spaces or into precipitants.

A solution of acetyl-nitro-cellulose in acetic acid or acetone, produced according to the above example, may for instance be pressed through fine orifices into a suitable liquid, in which the cellulose compound is not soluble, such as water, alcohol or naphtha, whereby the thin jets of liquid issuing from the orifices are caused to solidify to filaments, which are then drawn through the said liquid and wound on drums, while being kept at a suitable tension, until the voltatile substances have been removed. As an alternative method, the solution of the cellulose ester in acetone may be caused to pass from fine openings into a heated chamber and thereby solidified, then drawn out and dried, while under tension.

Instead of the solution of acetyl-nitro-cellulose alone, mixed solutions of acetyl-nitro-cellulose or of another compound cellulose-ester with a simple cellulose ester such as acetyl-cellulose or another organic acid ester of cellulose, or nitro-cellulose, may be used for the production of filaments. In this case the acetic acid- or acetone-solutions, for instance, may be mixed together and the threads or filaments produced in the manner described above. The threads, filaments or cords produced as described may be used for making woven fabrics, films or other products for ballistic, pyrotechnic and other purposes.

If the filaments are intended for the manufacture of woven fabrics to be used like ordinary textile fabrics, they are denitrated by any suitable process. They may also be partly or completely deprived of the last remnants of acid, so that finally a material is obtained, which consists of cellulose.

The denitration of the objects produced from nitro-acetyl-cellulose or another compound cellulose ester or from a combination of a compound cellulose-ester with an organic ester of cellulose or with nitro-cellulose may be effected, for instance, by means of hydro-sulfids, or the salts of the lower oxid of a metal which forms also higher oxids, either alone or mixed with each other, with or without the addition of a solvent of cellulose ester or a substance, which causes the same to soften and swell, such as alcohol or acetone. If, for instance, cuprous chlorid is used, the filaments or cords may be introduced into a bath which consists of cuprous chlorid, sodium chlorid solution and some alcohol and is slightly heated, and they may be allowed to remain in the same for some time. If desired, the filaments or cords may be treated with a softening substance, before they are introduced into the denitration mixture. By the same treatment, strips or ribbons, films and other products may be denitrated.

The disactylization of filaments or other bodies produced as described, may be effected, for instance, by means of dilute soda solution. According to the strength of the solution and the time, during which it acts, the filaments are disacetylized partly or completely. By the use of a softening substance the process of disacetylization is facilitated. The denitration and disacetylization may also be performed in one operation by causing alkali-hydro-sulfid to act on the material with the aid of heat.

What I claim is:—

1. The manufacture of filaments from acidylized nitro-cellulose, which consists in causing a solution of the compound cellulose ester to pass through an orifice in the shape of a liquid jet and then removing the solvent from the same, substantially as described.

2. The manufacture of filaments from cellulose compounds, which consists in causing a solution of acetyl-nitro-cellulose to pass through an orifice in the shape of a liquid jet and then solidifying the jet by removing the solvent from the same, substantially as described.

3. The manufacture of filaments from cellulose compounds, which consists in causing a solution of compound cellulose-ester to pass through an orifice in the shape of a jet, then solidifying the jet to a filament and finally denitrating the same, substantially as described.

4. The manufacture of filaments from cellulose compounds, which consists in causing a solution of acetyl-nitro-cellulose to pass through an orifice so as to form a jet, then solidifying the latter to a filament and denitrating the filament thus obtained, substantially as described.

5. The manufacture of filaments from cellulose compounds, which consists in causing a solution of a compound cellulose-ester to pass through an orifice, so as to form a jet, then solidifying the latter and finally denitrating and disacetylizing the filament thus obtained, substantially as described.

6. The manufacture of filaments from cellulose compounds, which consists in causing a solution of acetyl-nitro-cellulose to pass through an orifice, so as to form a jet, then solidifying the latter to form filaments and subsequently denitrating and disacetylizing the said filaments, substantially as described.

7. The manufacture of filaments from acidylized nitro-cellulose, which consists in causing a solution of the compound cellulose-ester and a simple cellulose-ester to pass through an orifice in the shape of a jet, and then solidifying the latter by the removal of the solvent, substantially as described.

8. The manufacture of filaments from cellulose compounds, which consists in causing a solution of a compound cellulose-ester and of nitro-cellulose to pass through an orifice in the shape of a jet, and solidifying the latter by the removal of the solvent, substantially as described.

9. Filaments obtainable from compound cellulose-esters by denitration and disacetylization, substantially as described.

10. Filaments obtainable from acetyl-nitro-cellulose by denitration and disacetylization, substantially as described.

In testimony whereof I have set my hand hereunto in the presence of two subscribing witnesses.

LEONHARD LEDERER.

Witnesses:
 JOHANN STROBEL,
 WALTHER DOHT.